3,107,629
CONTROLLABLE GEAR-TYPE HYDRAULIC
MACHINE
Georg Wiggermann, Kressbronn, Germany, assignor to
Reiners & Wiggermann Getriebe- und Maschinenbau,
Kressbronn, Germany, a corporation of Germany
Filed Mar. 14, 1961, Ser. No. 95,759
Claims priority, application Germany Mar. 14, 1960
5 Claims. (Cl. 103—120)

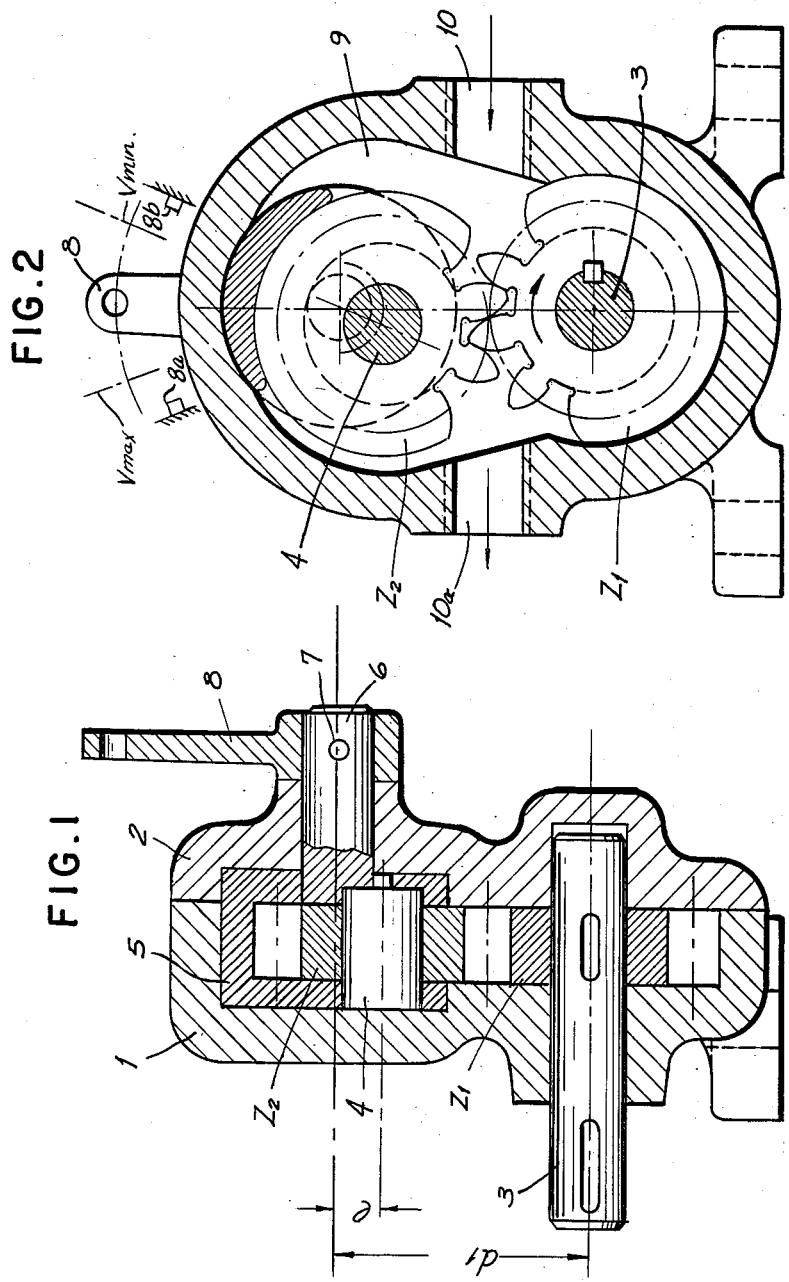

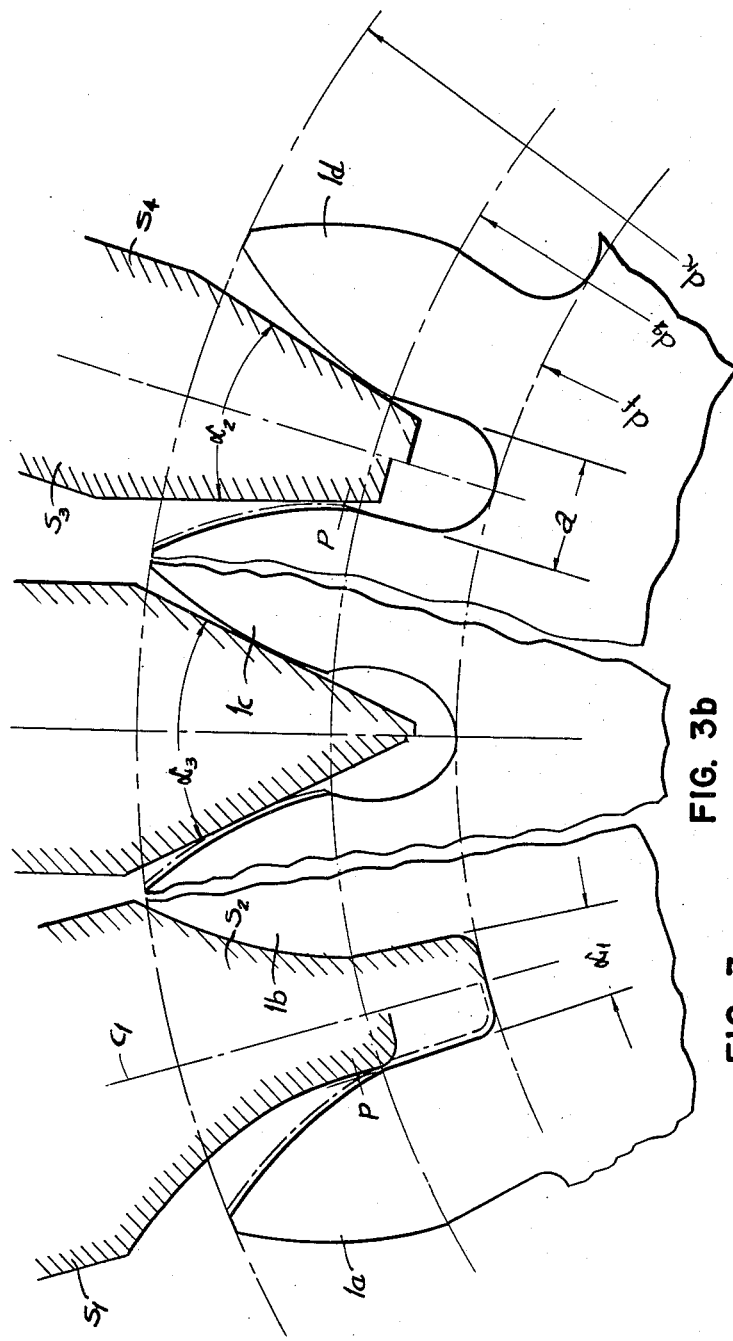

My invention relates to controllable hydraulic displacement machines of the gear type and has the object to improve the intermeshing spur gears in such machines toward reducing the manufacturing cost while preserving a wide range of delivery control.

The delivery control or regulation in such machines is effected by varying the radial spacing between the intermeshing spur gears which, together with the machine housing, form the pressure and suction chambers of the machine. In order to obtain a largest possible control range, it is necessary to give the involute teeth a design compatible with a wide range of change in radial spacing, and to utilize this range to its full extent. For this purpose, the diameter ($dk$) of the head (addendum) circle and the diameter ($dg$) of the base circle of the involute teeth, as well as the number ($z$) of teeth per gear are chosen to meet the following requirements:

(1) At minimum spacing between the spur gear axes, the head circles intersect the then obtaining straight line of meshing engagement at or near the points where the meshing lines are in contact with the base circles;

(2) At maximum spacing between the gear axes, the overlapping degree of the gear teeth has at least the value 1;

(3) The heads of the gear teeth are relatively pointed, the ratio between the greatest thickness of each tooth to the peripheral width of its head (each measured in arcuate degrees) being approximately 6 to 8.

Involute gear teeth designed in accordance with these requirements have a shape greatly differing from the conventional tooth shapes by an extremely large radial height of the teeth and a correspondingly large depth of the tooth gaps. The deep and narrow tooth gaps entail manufacturing difficulties, and it is a more specific object of my invention to eliminate such difficulties.

How this is done according to the invention will be described presently with reference to the embodiment of a variable-displacement gear pump illustrated by way of example on the accompanying drawings, in which:

FIG. 1 is an axial section through the pump;

FIG. 2 is a cross section of the same machine; and

FIGS. 3a, 3b, 3c each illustrate partially a peripheral portion of two of the intermeshing spur gears of the pump and are explanatory in showing three respectively different tooth-and-gap configurations.

The controllable two-gear positive-displacement machine illustrated in FIGS. 1 and 2 comprises a housing formed of a main portion 1 and a cover portion 2, in which the two spur gears $Z_1$ and $Z_2$ are journalled in meshing engagement with each other. Only a few teeth of each gear in the meshing range are illustrated in FIG. 2. The gear $Z_1$ is keyed to the driving shaft 3 of the machine and is directly journalled on the housing structure. The short shaft 4 of spur gear $Z_2$ is journalled in an eccentric member 5 which is journalled at its outer diameter within a cylindrical recess of housing portions 1 and 2. The eccentric member 5 has a shaft 6 passing through the cover portion 2 and protruding outwardly therefrom. The protruding end of shaft 6 carries a control arm 8 secured to shaft 6 by means of a cotter pin 7. The eccentric member 5 encloses the spur gear 2 at its two axial sides and also at its periphery with a close running fit. The large diameter of the eccentric member 5 is journalled in the wall of housing 1, 2 with such a close running fit that a return flow of the oil or other hydraulic medium from the pressure side to the suction side of the machine is prevented in all angular positions of the eccentric member.

The hollow space 9 in the housing surrounds the spur gear $Z_1$ over the major portion of the gear periphery with a close sealing fit. However, in the range of spur gear $Z_2$, the interior space 9 of the housing is radially widened to such an extent that the spur gear $Z_2$ can readily perform the displacement transverse to its axis occurring when the control shaft 6 of member 5 is turned by means of arm 8 within the entire available range of control displacement.

The two gears have involute teeth whose design, more fully described below, permits a largest possible variation in center spacing $d_1$ (FIG. 1) between the two gears. For this purpose, the diameter of the root circle (also called dedendum circle), the diameter of the head circle (also called addendum circle), and the number of teeth are so chosen relative to one another, that the teeth are almost pointed at the tip and that with minimum axial spacing or virtually clearance-free meshing engagement, the head circles of the gears intersect the meshing line substantially at those points where the meshing line runs tangential to the root circles; furthermore, at the largest axial spacing the head circles cut from the then obtaining meshing line a portion that is approximately equal to the meshing division; i.e. the degree of overlap is at least equal to the value one. To afford a particularly great control range, the center spacing between the spur gears may be reduced to such an extent that the tip of the teeth enter into an undercut portion of the tooth gaps.

The hydraulic medium to be delivered enters into the housing through the bore 10 and leaves the housing through a bore 10a. Both bores open into the interior 9 of the housing and are coaxially aligned at opposite sides of the meshing range.

The operation of the machine for pumping action is as follows: The spur gear $Z_1$ is continuously driven to rotate clockwise (FIG. 2) and to drive the spur gear $Z_2$ counterclockwise. The tooth gaps of both spur gears become filled with liquid entering through the bore 10. The liquid is entrained between the teeth toward the left-hand side of the housing space 9. From the pressure side, the liquid leaves the machine through bore 10. At the same time, the teeth in the meshing range of both gears prevent the liquid from returning from the pressure side at the left to the suction side at the right of the housing, with the exception of a residual quantity determined by the inevitable dead space between the teeth in the meshing range of the two gears.

The control or regulation of the volumetric delivery of the gear-type displacement machine, here described for operation as a pump, is predicated upon the fact that the just-mentioned dead space, acting in the negative sense upon the volumetric delivery, is varied by changing the spacing $d_1$ between the spur gears $Z_1$ and $Z_2$. This change in spacing is produced by turning the eccentric member, thus displacing the shaft 4 of gear $Z_2$ relative to the axis of the driving shaft 3.

In the illustrated example, the eccentricity of member 5 is such that when the axis of rotation of respective gears $Z_1$ and $Z_2$ and of the eccentric 5 are located on a straight line viewed from the front (FIG. 2), the two gears mesh nearly without clearance. With this setting, the control arm 8 is located in the outermost left-hand position as determined by a stationary stop $8a$. Since now the dead spaces in the meshing range are a minimum, this control position of arm 8 corresponds to the maximum ($V_{max}$) of volumetric delivery per rotation.

On the other hand, when control arm 8 is shifted toward the right into the outermost position determined by another stop $8b$, then the spur gears $Z_1$ and $Z_2$ are set by the eccentric member into the kinematically largest possible spacing, corresponding to an overlapping or meshing range of the gear teeth approximately equal to unity value. Consequently, now the dead spaces in the meshing range are a maximum. The resulting maximum return flow of hydraulic medium from the suction side to the pressure side results in the minimum ($V_{min}$) of positive delivery.

Consequently, the control and regulating range of the machine extends continuously between the volumetric quantities $V_{max}$ and $V_{min}$ and can be varied in a stepless manner by changing the angular setting of the control arm 8. This range of control can be made to extend approximately from one half up to full delivery.

The invention proper will more fully be explained with reference to FIG. $3a$, $3b$, and $3c$. The illustrated gear portion comprises four teeth denoted by $1a$, $1b$, $1c$ and $1d$, and intermediate three tooth gaps. The active involute or face portion of the teeth, extending between the base-circle diameter $dg$ and the head-circle diameter $dk$, has the same shape at all four teeth. The shape of the tooth gap between the teeth $1a$ and $1b$ corresponds to the conventional standard shape, at which the involute faces merge with straight lines which converge at the base circle toward the gear center point and define with each other the angle $\alpha_1$, and which ultimately merge through rounded corners with the root circle. In order to obtain sealing and accurately mutual rolling of the tooth faces between the meshing spur gears, it is necessary to grind the faces. According to what is customary with normal spur gears, the entire tooth face, including the tooth flank, would be ground and polished. For this purpose, the entire tooth face and flank area would have to be milled to a measure which includes a slight excess of material to be subsequently ground and polished away. This is indicated by a dot-and-dash line in the left half portion of the tooth gap located between the teeth $1a$ and $1b$. The other half portion shown at the right of the tooth-gap center line $C_1$ corresponds to the completely finished tooth shape.

The extremely large radial extent of the otherwise narrow tooth gap is unsuitable for machining by rotating milling tools as well as for grinding of the flanks by rotating tools. Therefore, the tooth gaps must be milled and ground by the time-consuming and hence expensive form-milling and form-grinding operations. The large area of contact engagement occurring during grinding in the vicinity of the tooth foot between grinding disc and workpiece results in very disagreeable lateral pressure forces acting upon the workpiece, and also in considerable generation of heat which tends to cause surface fissures or cracks at the workpiece. If it is attempted to laterally brace the grinding disc and to shorten the grinding time by performing the grinding with two grinding discs aligned on both sides of the gear and shaped in accordance with the gap to be produced, then there results the disadvantage that the grinding-disc portion which extends radially and hence acts upon the gap in the vicinity of the tooth foot, is greatly reduced in diameter in the event of slightest wear so that the consumption of grinding discs becomes excessive.

The above-mentioned relations are apparent from the profile of the grinding disc shown in section and partly hatched in the gap between the teeth $1a$ and $1b$. The side of the grinding disc $S_1$ at the left of the tooth-gap center line $C_1$ is shown in the position occupied at the beginning of the grinding operation. The other side $S_2$ of the grinding disc shown by hatched contour area at the right of the gap center line $C_1$, is shown in the position occupied at the termination of the grinding operation.

Now, for simplifying the production and reducing its cost, it is a feature of my invention to limit the flank grinding operation and hence the ground profile portion of each tooth to the flank portion located between the head-circle diameter $dk$ and the base-circle diameter $dg$, whereas the inactive gap surface of the teeth, beginning in the region of the pitch circle is given its ultimate dimensions by the milling or machining operation that precedes grinding.

Such a tooth design according to the invention is permissible in kinematic respects because the flank portions located within the base circle never participate in the meshing engagement. On the other hand, for the reasons explained above, the spur gears in hydraulic variable-displacement pumps, in order to attain a large delivery volume, must provide for such a deep mutual meshing engagement of the respective gear teeth by having the tooth faces accurately profiled practically down to the base circle. If now, for example, the conventional excess material, usually left at each tooth flank portion, is omitted as required by the present invention, then the radial foot flanks machined to finished dimensions extend in such a manner that the excess material remaining on the tooth body for the purpose of subsequent grinding, has its full thickness only at the point P. During the preceding manufacturing operation such as premilling or case hardening, the occurrence of indexing errors must always be counted with, and the slender tapering of the material to be ground away from the tip down to the base circle, then results in undesired inaccuracies at the merger location from the face portion finished by grinding to the unground face portion.

In order to improve these conditions, and in accordance with another feature of my invention, the tooth-gap portion located within the base-circle diameter $dg$ is given a shape which is essentially constituted by two equidistant straight lines which are spaced from each other by the amount "$a$" and which merge with the root circle (diameter $df$) through a greatly rounded contour portion. This is shown for the tooth gap between the teeth $1c$ and $1d$. The mutual spacing "$a$" is equal to the distance between mutually neighboring intersection points of the involute with the base circle (diameter $dg$) or is only slightly larger than this measure. As a result, the tapering ends of the "grinding addition" (material to be ground away between base circle and head circle), one of these tapering portions being formed by the above-mentioned equidistant lines, is greatly shortened because of the knee in the flank shape at the transition between the equidistant line and the involute. Consequently, the above-mentioned point P is shifted much closer to the base circle. This greatly reduces the sensitivity of the grinding operation relative to the above-mentioned indexing errors. Another advantage of the last-mentioned feature is that it permits performing the flank grinding operation by the rolling method. This is due to the fact that, by virtue of the above-described knee of the tooth profile in the vicinity of the base circle, the grinding disc is given some degree of overtravel, particularly if the spacing "$a$" is chosen slightly larger than the distance between the respective involute intersection points with the base circle. Consequently, the periphery of the grinding disc need only enter a slight amount into the tooth-gap portion that is not to be ground. This will be apparent from a comparison of the tooth gap between the teeth 1c and 1b with the grinding-disc profiles $S_3$ and $S_4$. The hatched profile region $S_3$ of the grinding disc is again shown at the beginning of the grinding operation, and the profile region $S_4$ is shown at the end of the grinding operation.

With such a design of the tooth gap, the wedge angle $\alpha_2$ must be rather small, i.e. the grinding-disc profile must have a considerable taper, so that relatively large diameter losses are encountered due to wear and recalibration of the grinding disc. For further explanation, it may be mentioned that the dimension of the grinding disc in the direction normal to the engagement with the workpiece will change by an amount $(x)$ due to wear of the grinding disc and by thereafter again calibrating it with a diamond tool. This change always causes a reduction in diameter in the amount of $\Delta D = 2x/\sin \alpha$. Consequently, referring for example to the grinding disc shown between the teeth 1c and 1d, a wearing down of the grinding disc in the amount of $x=0.1$ mm. already results in a diameter reduction of approximately 0.4 mm. which involves considerable expenses for grinding discs.

The tooth-gap design in accordance with the above-mentioned features of the invention, while affording the advantages described, still requires that the milling of the tooth gaps be effected by form-milling cutters and by means of the indexing method. However, it is another object of my invention to also eliminate this necessity and to further improve the tooth-gap shape, so that the milling of the tooth gaps, in the region of the tooth heads where grinding addition of material is provided, as well as in the region of the tooth foot where the milling results in the ultimate dimensions, can be effected in a single operation by means of straight cutters and by a rolling-type milling operation. It is also an object, conjointly with the one just mentioned, to further reduce the transition of the tooth foot without grinding addition into the flank portion containing a grinding addition, thus additionally reducing the criticality of the grinding operation and hence the possibility of indexing errors or other defects.

To achieve these further objects, and in accordance with another feature of my invention, the gap portion which forms the tooth foot within the base circle (diameter $dg$) is given an undercut which commences in the region of the pitch circle and constitutes a widening gap portion commencing near the base circle. Such a gap shape is shown between the teeth 1b and 1c. The transition from the tooth foot to the tooth head now constitutes a relatively sharp knee which results in a further shortening of the transition zone of the foot portion without grinding addition to the head portion with grinding addition. As a result, a further diminution of the detrimental effect of indexing errors and the like is achieved. Above all, however, the tooth gap with undercut can be produced with a comparatively favorable cutter profile, and the milling as well as the grinding of the gear teeth can be performed by the rolling method rather than necessitating an indexing method.

The undercut tooth shape also has the advantage that the grinding disc, during rolling-type grinding operation, can be permitted to enter more deeply into the tooth gap. This affords increasing the wedge angle $\alpha_3$. The larger wedge angle improves the relation between grinding-disc wear $(x)$ to the change in grinding-disc diameter, and also reduces the area of engagement between grinding disc and tooth flank, thereby reducing the generation of heat that may lead to grinding fissures. Furthermore, the grinding pressure, acting in the direction normal to the engagement, assuming a greater component in the direction toward the grinding-disc axis, thus reducing the transverse stress imposed upon the grinding disc. Another advantage of the undercut tooth flank is the fact that the radial length of the knee which determines the transition between the foot and the active head of the tooth flank, is much less affected by slight departures from the accurate grinding-disc diameter.

Another important advantage of limiting the ground or polished flank portion to the tooth-head region is an increased strength of the teeth in the region of the tooth foot. This is due to the fact that the positive pressure stress, resulting for example from case hardening and occurring in the range of the case-hardened zone at the surface of the material, remains preserved by leaving this surface zone undisturbed by eliminating the grinding of the tooth foot.

In many practical applications of variable-displacement gear pumps, these pumps are operated in only one direction of rotation, and a change in running direction is not readily possible because it would require changes in internal design of the pump housing. Relating to such pumps, and in accordance with a further feature of my invention, the manufacture of such gear pumps is further facilitated and reduced in cost by giving only the one face side of each tooth a ground surface that enters into active meshing engagement with the face of the meshing spur gear.

Variable-displacement gear pumps may comprise two, three or more gears, a pump with a chain of three gears being shown, for example, in my copending application Serial No. 701,764 filed December 10, 1957. It is apparent, therefore, that due to the relatively high cost of the gears in comparison with the total manufacturing cost of such pumps, the improvement afforded by my invention constitutes an appreciable reduction in manufacturing expenses.

While reference is made in the foregoing to variable-displacement gear pumps, it will be understood that such machines comprise those that can be operated as hydraulic motors. It should further be understood that the invention is also applicable to spur gear pumps with a fixed spacing between the gear axes, if the meshing teeth in these pumps, for obtaining high volumetric delivery, possess the above-characterized gear-tooth shapes necessary for variable-displacement machines of the gear type. The particular features of such gear teeth can be described as requiring a height of the tooth heads $Hk = (dk - dt)/2$ which departs from the standard measure $(Hk = m)$ by amounting to at least 1.25 times the value of the corresponding modulus pitch $m$ (teeth per metric unit of distance on the pitch circle).

I claim:

1. A hydraulic positive-displacement machine, comprising a housing having inlet and outlet ducts, gears rotatable in said housing, each gear having involute teeth meshing with those of the other gear, said gears forming respective pressure and suction chambers together with said housing, one of said gears being displaceable toward and away from the rotation axis of the other gear, the head of said teeth having between base circle and head circle a height equal to at least 1.25 times the modulus pitch on the pitch circle, and having a ground flank surface limited to the flank portion between the base circle and head circle.

2. In a hydraulic machine according to claim 1, said teeth forming intermediate tooth gaps whose foot portion, located within the base circle, has a contour formed by two straight lines parallel to the radial center line of the gap.

3. In a hydraulic machine according to claim 1, said teeth forming intermediate tooth gaps whose foot portion, located within the base circle, has an undercut shape with a contour formed by an arcuate curve commencing near the base circle and having its greatest width spaced from the base circle in the radially inward direction.

4. In a hydraulic machine according to claim 1, said teeth forming intermediate tooth gaps whose foot portion, located within the base circle, has a milled surface rougher than said ground flank surface.

5. In a hydraulic machine according to claim 1, each tooth having said ground flank surface at only one side, the other flank side and the tooth portion within the base circle having a rough surface compared with said flank surface.

References Cited in the file of this patent

UNITED STATES PATENTS

| | | |
|---|---|---|
| 42,605 | Skaats | May 3, 1864 |
| 171,651 | Crocker | Jan. 4, 1876 |
| 1,698,214 | Copland et al. | Jan. 8, 1929 |
| 2,845,031 | Guibert | July 29, 1958 |
| 2,869,473 | Kreamer | Jan. 20, 1959 |

FOREIGN PATENTS

| | | |
|---|---|---|
| 40,214 | Denmark | May 17, 1929 |
| 717,466 | Germany | Feb. 14, 1942 |
| 1,029,201 | Germany | Apr. 30, 1958 |
| 1,195,288 | France | May 19, 1959 |